J. E. WEBER & P. KNUTSON.
Coffee-Pots.
No. 144,936.  Patented Nov. 25, 1873.
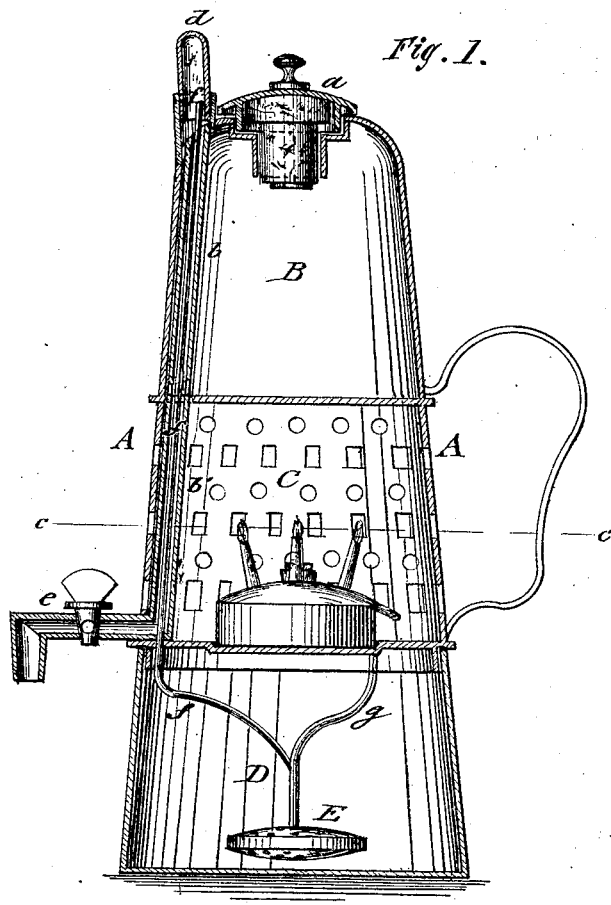
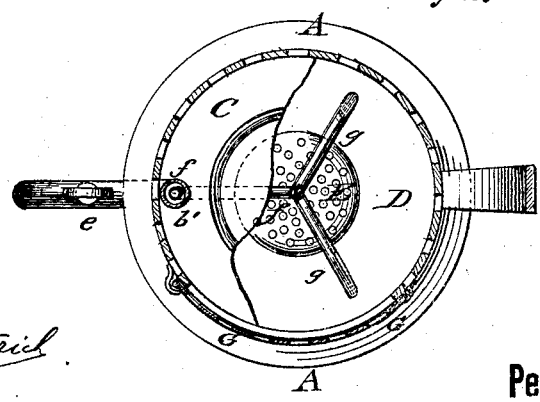
Witnesses:
Inventor:
J. E. Weber
P. Knutson
Per ⎯⎯⎯ Attorneys

UNITED STATES PATENT OFFICE.

JOHN E. WEBER AND PETER KNUTSON, OF LA CROSSE, WISCONSIN.

IMPROVEMENT IN COFFEE-POTS.

Specification forming part of Letters Patent No. 144,936, dated November 25, 1873; application filed May 24, 1873.

*To all whom it may concern:*

Be it known that we, JOHN E. WEBER and PETER KNUTSON, of La Crosse, in the county of La Crosse and State of Wisconsin, have invented a new and Improved Coffee and Tea Pot, of which the following is a specification:

In the accompanying drawing, Figure 1 represents a vertical section of our improved coffee and tea pot; and Fig. 2, a horizontal section of the same on the line $c\ c$, Fig. 1.

Similar letters of reference indicate corresponding parts.

The invention will first be fully described, and then pointed out in the claims.

In the drawing, A represents the pot, which is composed of three different sections—the upper or water receptacle B, the middle one C, into which the gas, alcohol, or coal-oil lamp is placed, and the lower receptacle D, for the coffee or other articles which are intended to be boiled. The water-receptacle B has a lid, $a$, through which the water is filled in, and which closes hermetically thereon. It is provided with a tube, $b$, which extends along the side of receptacle B from a point near the bottom upward through the top part thereof, opening into a glass bulb, $d$, which is cemented or otherwise connected in suitable manner with tube $b$. The bottom of the receptacle B is perforated below the end of tube $b$, and connected by a tube, $b'$, of the same size as tube $b$, along the side of part C, turning at its bottom to the outside of the pot, and ending in a faucet, $e$. A smaller tube, $f$, passes inside of tubes $b\ b'$ from the glass bulb $d$, down through parts B and C into the lower receptacle D, bending over to the center, and carrying a double strainer, E, at the end near the bottom of receptacle D. One or more wire brackets, $g$, soldered to the top of receptacle D, support tube $f$ and strainer E. The middle part C has symmetrically-arranged perforations, to admit the air freely to the lamp F, placed into an indentation of the bottom thereof, and is provided with a hinged door, G, to lock this part.

By means of this arrangement any special support on which the pot is to be placed for cooking is rendered unnecessary, and the whole apparatus is always complete for use.

The lower part, D, is detachable, and the coffee, tea, &c., placed therein. The upper receptacle is filled with water, closed tightly, and the lamp then lighted. The generation of the steam forces the boiling water up through tube $b$ to the glass bulb $d$, and then, through the smaller tube $f$ and the strainer E, to the lower part, extracting the strength of the coffee. The lamp is then extinguished, and the liquid slowly drawn up again into the water-receptacle B. The process is repeated if the coffee is desired very strong.

The glass bulb or tube $d$ indicates, by the passage of the liquid through it, the different stages of the cooking process. The coffee is then drawn off for use through tube $b'$ and faucet $e$. As the whole process is completed in the pot, the aromatic flavor is fully retained, and a superior coffee produced.

Having thus described our invention, we claim as new and desire to secure by Letters Patent—

1. The coffee-pot A, consisting of the water-receptacle B, the middle part C, and the lower receptacle D, the parts B and D being connected by tubes $b$ and $f$, having strainer E, substantially as and for the purpose described.

2. The water-receptacle B, having tube $b$ with extension glass bulb $d$, for indicating the boiling process, and tightly-closing lid $a$, as described.

3. The lower receptacle D, having tube $f$ with strainer E, supported by wires $g$.

JOHN E. WEBER.
PETER KNUTSON.

Witnesses:
D. W. VAN BERGH,
H. E. HUBBARD.